J. DUNNER.
STUFFING MACHINE.
APPLICATION FILED DEC. 26, 1918.

1,330,626.

Patented Feb. 10, 1920.
2 SHEETS—SHEET 1.

INVENTOR
Julius Dunner
BY
Alexander Drucy
ATTORNEYS

J. DUNNER.
STUFFING MACHINE.
APPLICATION FILED DEC. 26, 1918.
1,330,626.
Patented Feb. 10, 1920.
2 SHEETS—SHEET 2.
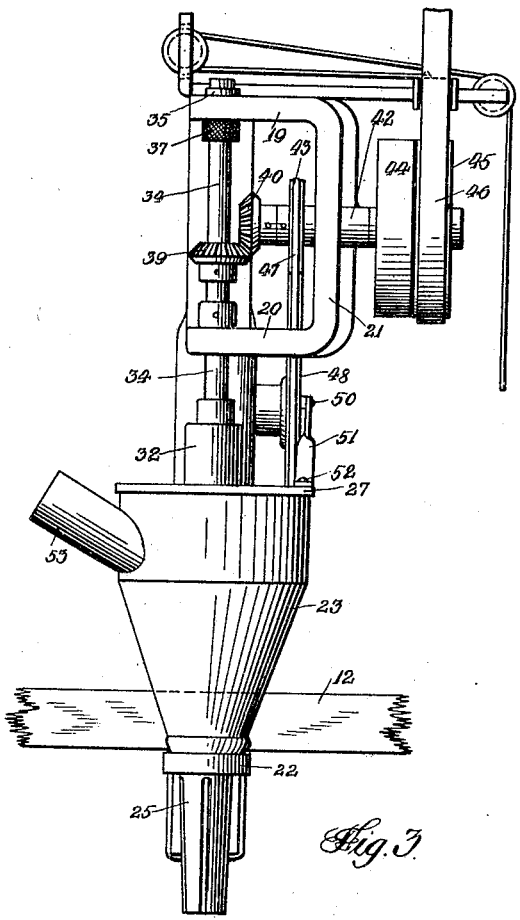
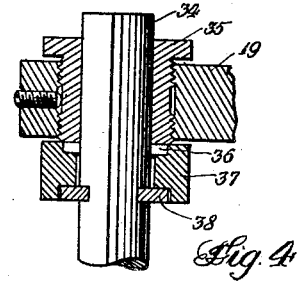
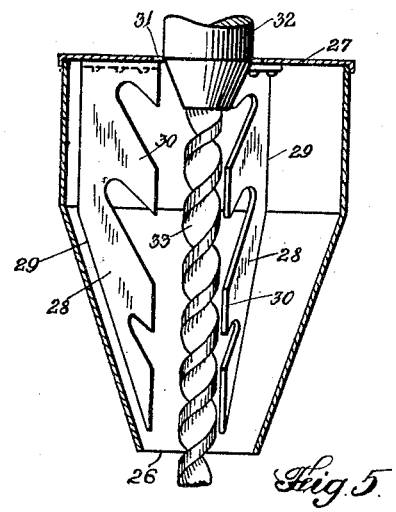
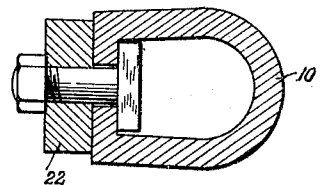
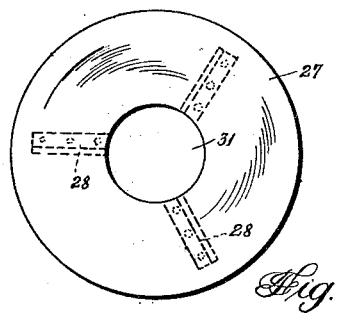
INVENTOR
Julius Dunner
BY
Alexander Arme
ATTORNEYS

UNITED STATES PATENT OFFICE.

JULIUS DUNNER, OF BROOKLYN, NEW YORK.

STUFFING-MACHINE.

1,330,626.  Specification of Letters Patent.  Patented Feb. 10, 1920.

Application filed December 26, 1918. Serial No. 268,428.

*To all whom it may concern:*

Be it known that I, JULIUS DUNNER, a Russian, now residing in the United States, residing at Brooklyn, in the county of Kings and State of New York, have invented new and useful Improvements in Stuffing-Machines, of which the following is a specification.

This invention relates to a stuffing or packing machine, the invention being more particularly related to a machine for stuffing or packing articles such as balls, dolls, cushions and the like, to which form and fashion are given by means of a filler.

A principal object of the invention is the provision of a stuffing machine including a hopper, in which is provided an oscillating device for mixing and directing the filling material, and in which is also provided a rotating screw for conducting and pressing the filling material into the article to be stuffed.

Another object of the invention is the provision of a simple and practical power driven machine which is adapted to mix and pack sawdust, cork or other similar filling material with much greater rapidity and uniformity than can be accomplished manally by workmen.

A still further object is the provision of a machine of this character capable of efficient use in connection with my automatically operated mold support, for which application for Letters Patent of the United States was filed Dec. 26, 1918, Serial No. 268,427.

With the foregoing objects in view and others, the invention resides in the details of construction and in the arrangement and combination of parts hereinafter described, defined in the claims, and illustrated in the accompanying drawings, forming a material part of this specification.

In the accompanying drawings:—Figure 1 is a view in side elevation of the machine.

Fig. 3 is a view in front elevation, showing the machine as it appears when looking toward the table or support upon which it is clamped.

Fig. 4 is an enlarged sectional view, illustrating the method of mounting the tool supporting shaft at its upper end.

Fig. 5 is an enlarged vertical section through the hopper.

Fig. 6 is a cross-section, taken on the line 6—6 of Fig. 1.

Fig. 7 is a top plan view of the hopper.

Figure 1:
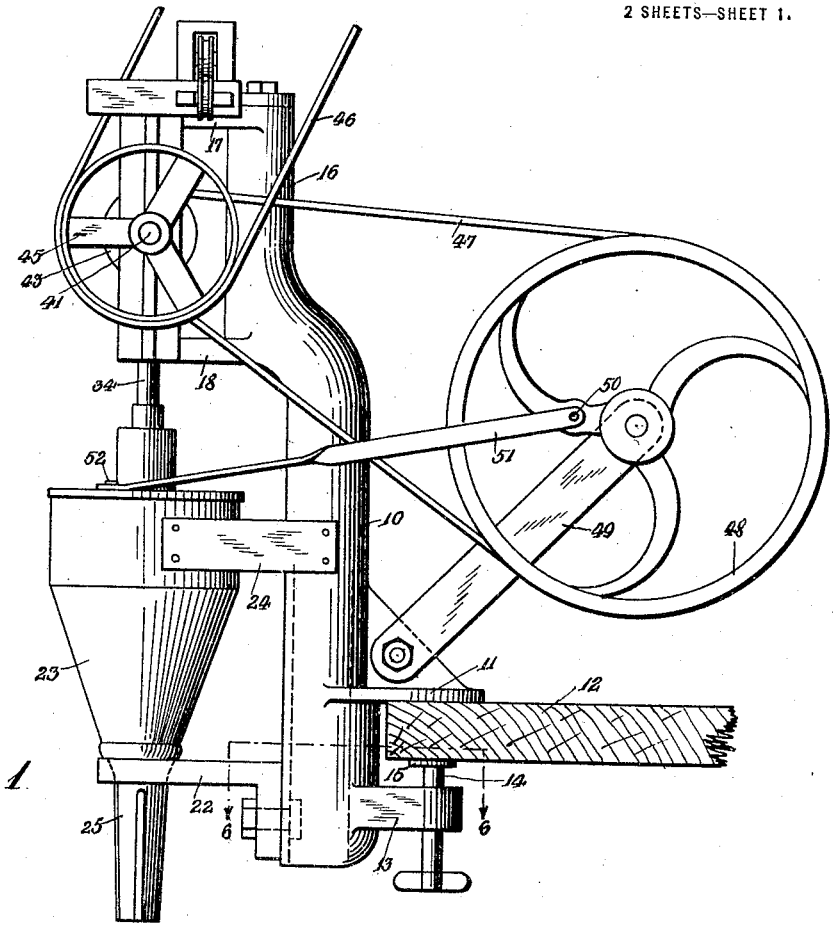
Figure 2:
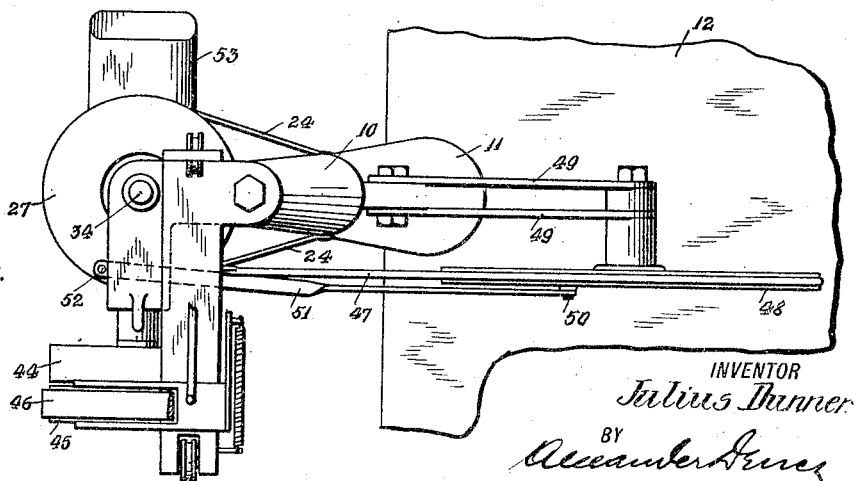
Fig. 2 is a top plan view of the same.

In the manufacture of stuffed articles, such as balls, doll bodies, doll limbs, cushions and the like, the task of manually introducing and packing the sawdust, cork or other similar loose filler, is a tedious and laborious one; and only especially skilled operators are able to fill or pack like articles or parts with anything like exactness, so that the same will have substantially the same weight, the same fashion and the same degree of compactness. This invention, therefore, has been developed with a view of performing the stuffing and packing work mechanically, and in such manner that like articles or parts will have substantially the same weight, the same fashion and the same degree of compactness.

With more particular reference to the accompanying drawings, the numeral 10 denotes a bracket structure, preferably cast with a hollow interior (Fig. 5), and at its lower end with a reinforced ledge 11 adapted to engage flat upon a table or other similar horizontal support as 12, and also with a lug 13 through which may be threaded a wing bolt 14, adapted to be fitted with a clamping disk 15, which may be pressed tightly against the underneath side of the table or support 12, whereby securely to mount the structure in upright position. At its top end the bracket 10 is cast with a forward offset portion 16 having the spaced forwardly extending arms 17 and 18. Bolted or otherwise rigidly secured to these arms is an angular frame, consisting of the angular horizontal arms 19 and 20, connected at their outer ends by an integral vertical plate 21.

Bolted for vertical adjustment to the front side of the bracket 10 at its lower end is a ledge 22, upon which is securely mounted a hopper 23, the top portion of which is held braced with respect to the bracket 10 by a plate 24 or other equivalent means.

Detachably secured within and depending from the ledge 22, is a funnel or guide 25, which receives the filling material from the open bottom 26 of the hopper. Rotatably mounted on the top of the hopper is a cover plate or disk 27, from which depends within the hopper and around a central zone therein, the mixing and guiding fingers 28, the outer edges 29 of which are formed as shown to conform with the contour of the hopper and in the inner edges of which are cut the spaced teeth 30, which are directed toward the opening 26. The cover plate 27 has a central opening 31 through which projects a chuck 32, for holding a stuffing screw 33 or other similar tool, which extends downwardly in a central position through the hopper and through the funnel 25.

The chuck 32 is carried on a vertical shaft 34 which is journaled in the arm 20 and also in a bearing nut 35, which is threaded through the arm 19 as clearly illustrated in Fig. 4. Bearing against the lower end of the nut 35 is a fiber washer 36, held in a ring 37, which is rotatably mounted on a flange 38 fixedly carried by the shaft 34. The upper end of the shaft 34 is thus journaled so that the shaft may have limited yielding upward movement when the screw is packing downwardly against a substantially compact filling, the object of permitting this yielding upward movement being to relieve the screw 33 as well as the meshing bevel gears 39 and 40 of undesirable strain.

The shaft 34 is driven by the said gears 39 and 40, the former being secured on the shaft and the latter on the end of a horizontal shaft 41, which is journaled in a bushing 42 set in the vertical plate 21. Shaft 41 also carries the tight pulleys 43 and 44 and a loose pulley 45. It is driven through the medium of a belt as 46 which normally engages the loose pulley 45, but which may be shifted to the tight pulley 44 by any common or suitable belt shifting mechanism. By a belt 47, the pulley 43 drives a large wheel 48, mounted for rotation on an axis carried by the arm 49, which is secured to and projects from the ledge 11, as best seen in Fig. 1. Pivoted at 50 to the wheel 48 is a pitman 51, which is operatively connected at 52 with the cover plate 27, this arrangement being such when the wheel 48 is driven the cover plate 27 oscillates, carrying the fingers 28 to and fro about the revolving screw 33 to distribute the filling around the screw, and direct it toward the funnel 25.

The sawdust or other filling is introduced through a spout or funnel 53 connected with the upper part of the hopper 23. The filling is usually of various grades of fineness, and when thus introduced into the hopper is first thoroughly mixed by the oscillating movements of the fingers around the rotating screw 33, and then conducted by the screw through the funnel 25 and pressed into the article to be stuffed. In my companion application above referred to, I illustrate and describe in detail how the article to be stuffed may be supported so that the screw may insert and press the filling thereinto with the degree of compactness desired.

Having thus described my invention, what I claim is:—

1. In a machine of the class described, the combination with a support, a hopper carried thereby and provided with a lateral material inlet and a bottom material outlet, a vertical shaft operatively carried by said support and provided with a tool holder projecting into the hopper through the open top thereof, a screw engaged with said tool holder and extending through said hopper and said material outlet to conduct material from the hopper, a rotatable cover plate for the open top of the hopper spacedly encircling the tool holder, toothed fingers depending from said cover plate within the hopper and around said screw, means carried by the support for driving said shaft, and means operated by said driving means for communicating oscillating movement to said cover plate.

2. The combination of a hopper having a lateral material inlet and a funnel-shaped bottom outlet, a screw operatively sustained to extend through said hopper and through said funnel-shaped outlet to conduct material therethrough, means for rotating said screw, a rotatable cover plate supported on said hopper and centrally apertured to encircle the screw, toothed fingers depending from the cover plate within the hopper and about said screw, the same being adapted to coöperate with said screw in mixing material and in directing it toward the outlet, and means for oscillating said cover plate.

3. In a machine of the class described, the combination of a hopper provided with a funnel-shaped bottom outlet, a vertical shaft provided with tool holding means extending into said hopper centrally thereof, a screw carried by said tool holding means and extending through said hopper and said bottom outlet to conduct material therethrough, a cover plate rotatably mounted on said hopper and apertured to spacedly encircle said tool holding means, toothed fingers depending from said cover plate within the hopper and about said screw to coöperate with the latter in mixing and conducting material, a driving shaft, means for operating the vertical shaft from said driving shaft, and means operated by said driving shaft for imparting oscillating movement to said cover plate.

4. A machine of the class described provided with a circular receptacle having a funnel-shaped bottom and having a lateral inlet near its top end through which material may be introduced thereinto, a rotary screw sustained centrally in said receptacle and projecting through said bottom for discharging material from the receptacle, a circular cover plate rotatably mounted on the top of said receptacle and provided with an aperture to spacedly encircle said screw, toothed fingers projecting from the cover plate within the receptacle and about said screw and adapted to coöperate therewith in mixing material and in conducting the same when mixed toward the bottom opening, a driven shaft, means for rotating said screw from the shaft and means whereby to oscillate said cover plate from the shaft.

In testimony whereof I have signed my name to this specification.

JULIUS DUNNER.